US010793376B2

(12) United States Patent
Ukisu et al.

(10) Patent No.: US 10,793,376 B2
(45) Date of Patent: Oct. 6, 2020

(54) ARTICLE TRANSPORT FACILITY

(71) Applicant: Daifuku Co., Ltd., Osaka-shi (JP)

(72) Inventors: Kenichi Ukisu, Tokyo (JP); Atsushi Kurayama, Tokyo (JP); Sadataka Nishihara, Tokyo (JP)

(73) Assignee: Daifuku Co., Ltd., Osaka-shi (JP)

(*) Notice: Subject to any disclaimer, the term of this patent is extended or adjusted under 35 U.S.C. 154(b) by 83 days.

(21) Appl. No.: 16/211,390

(22) Filed: Dec. 6, 2018

(65) Prior Publication Data

US 2019/0177095 A1 Jun. 13, 2019

(30) Foreign Application Priority Data

Dec. 11, 2017 (JP) ................................. 2017-237137

(51) Int. Cl.

| | |
|---|---|
| *G06F 7/00* | (2006.01) |
| *B65G 47/90* | (2006.01) |
| *B65G 37/00* | (2006.01) |
| *B65G 1/04* | (2006.01) |
| *G05B 19/418* | (2006.01) |
| *B65G 47/52* | (2006.01) |
| *B65G 47/91* | (2006.01) |

(52) U.S. Cl.
CPC ......... *B65G 47/905* (2013.01); *B65G 1/0485* (2013.01); *B65G 37/00* (2013.01); *B65G 47/52* (2013.01); *B65G 47/91* (2013.01); *G05B 19/418* (2013.01); *B65G 2203/0216* (2013.01); *B65G 2203/041* (2013.01)

(58) Field of Classification Search
None
See application file for complete search history.

(56) References Cited

U.S. PATENT DOCUMENTS

| | | | |
|---|---|---|---|
| 2018/0164719 A1* | 6/2018 | Stowitts | ................ B41J 11/002 |
| 2019/0164307 A1* | 5/2019 | Aida | ........................ G06T 7/70 |

FOREIGN PATENT DOCUMENTS

JP 201539767 A 3/2015

* cited by examiner

*Primary Examiner* — Yolanda R Cumbess
(74) *Attorney, Agent, or Firm* — The Webb Law Firm

(57) ABSTRACT

The presence of an article in a second container is recognized based on image capture information from an image capture apparatus, and the type of the article whose presence has been recognized is determined by a determining portion. A control apparatus performs a transfer control on an article that has been recognized and whose type has been determined by the determining portion, and a position correction control on an article that has been recognized but whose type has not been determined by the determining portion. During the transfer control, the transfer apparatus is controlled to hold a first position on an article contained in the second container to transfer this article W1 to a first container. During the position correction control, the transfer apparatus is controlled to determine a second holding position on an article contained in the second container, and to hold the second holding position to move the article within the second container.

5 Claims, 7 Drawing Sheets

ARTICLE TRANSPORT FACILITY

CROSS-REFERENCE TO RELATED APPLICATION

This application claims priority to Japanese Patent Application No. 2017-237137 filed Dec. 11, 2017, the disclosure of which is hereby incorporated in its entirety by reference.

BACKGROUND OF THE INVENTION

Field of the Invention

The present invention relates to an article transport facility that includes a transfer apparatus for transferring a soft article from a second container to a first container.

Description of the Related Art

A conventional example of such an article transport facility is described in JP 2015-039767A. The article transport facility described in JP 2015-039767A transfers a plurality of articles to a container using a transfer apparatus (picking robot P). In this article transport facility, there are cases where an image of the inside of a second container is captured by an image capture apparatus, the presence of the article contained in the second container is recognized, and the type of the article is also recognized, based on image capture information from this image capture apparatus, and a position on the article appropriate for the recognized type is held by the transfer apparatus to transfer this article.

SUMMARY OF THE INVENTION

In the case of transferring a plurality of types of articles using the transfer apparatus, a preset position is held in accordance with the type of the article contained in the second container to transfer this article. However, if, for example, the article is soft, the shape of the article in the second container may differ from an appropriate shape thereof. For this reason, the type of the article contained in the second container may not be able to be recognized based on the image capture information from the image capture apparatus. In this case, there are cases where it is determined that the article cannot be held by the transfer apparatus, the article transport facility is then temporarily stopped, an operator corrects the shape of the article in the second container to the appropriate shape thereof, and thereafter the transfer using the transfer apparatus is resumed. In such cases, transfer cannot be efficiently performed by the transfer apparatus.

There is a demand for realizing an article transport facility in which articles can be efficiently transferred by the transfer apparatus.

In view of the foregoing situation, a characteristic configuration of an article transport facility is an article transport facility that includes a transfer apparatus for transferring a soft article from a second container to a first container, and a control apparatus for controlling the transfer apparatus, the article transport facility including: an image capture apparatus configured to capture an image of the article in the second container; and a determining portion configured to recognize the presence of the article in the second container, and determine the type of the article whose presence has been recognized, based on image capture information from the image capture apparatus, wherein a first holding position at which the article is held by the transfer apparatus is set for each type of article, the control apparatus performs transfer control that is performed on the article that has been recognized and whose type has been determined by the determining portion, and position correction control that is performed on the article that has been recognized but whose type has not been determined by the determining portion, during the transfer control, the transfer apparatus is controlled to hold the first holding position on the article contained in the second container and move the article to the first container, and during the position correction control, the transfer apparatus is controlled to determine a second holding position at which the article contained in the second container can be held by the transfer apparatus, and hold the second holding position to move the article within the second container.

With this configuration, as for an article whose type has been determined by the determining portion, the article can be transferred from the second container to the first container by the transfer apparatus by performing the transfer control. In the case of thus transferring the article, the article is transferred with the first holding position, which is preset on the article, being held by the transfer apparatus, and accordingly, the article can be readily transferred appropriately from the second container to the first container.

Also, as for an article whose type has not been determined by the determining portion, the article is moved within the second container by the transfer apparatus by performing the position correction control. By thus moving the article within the second container, the orientation of a soft article is expected to change. For this reason, there are cases where the type of an article after being moved through the position correction control is determined by the determining portion, and the article whose type has been determined by the determining portion can be appropriately transferred from the second container to the first container by performing the transfer control.

Thus, even if there is an article whose type has not been determined by the determining portion, articles can be continuously transferred by the transfer apparatus without stopping the article transport facility, by performing the position correction control. As a result, the articles can be efficiently transferred by the transfer apparatus.

DETAILED DESCRIPTION OF PREFERRED EMBODIMENTS

1. Embodiment

An embodiment of an article transport facility will be described based on the drawings.

Figure 1:
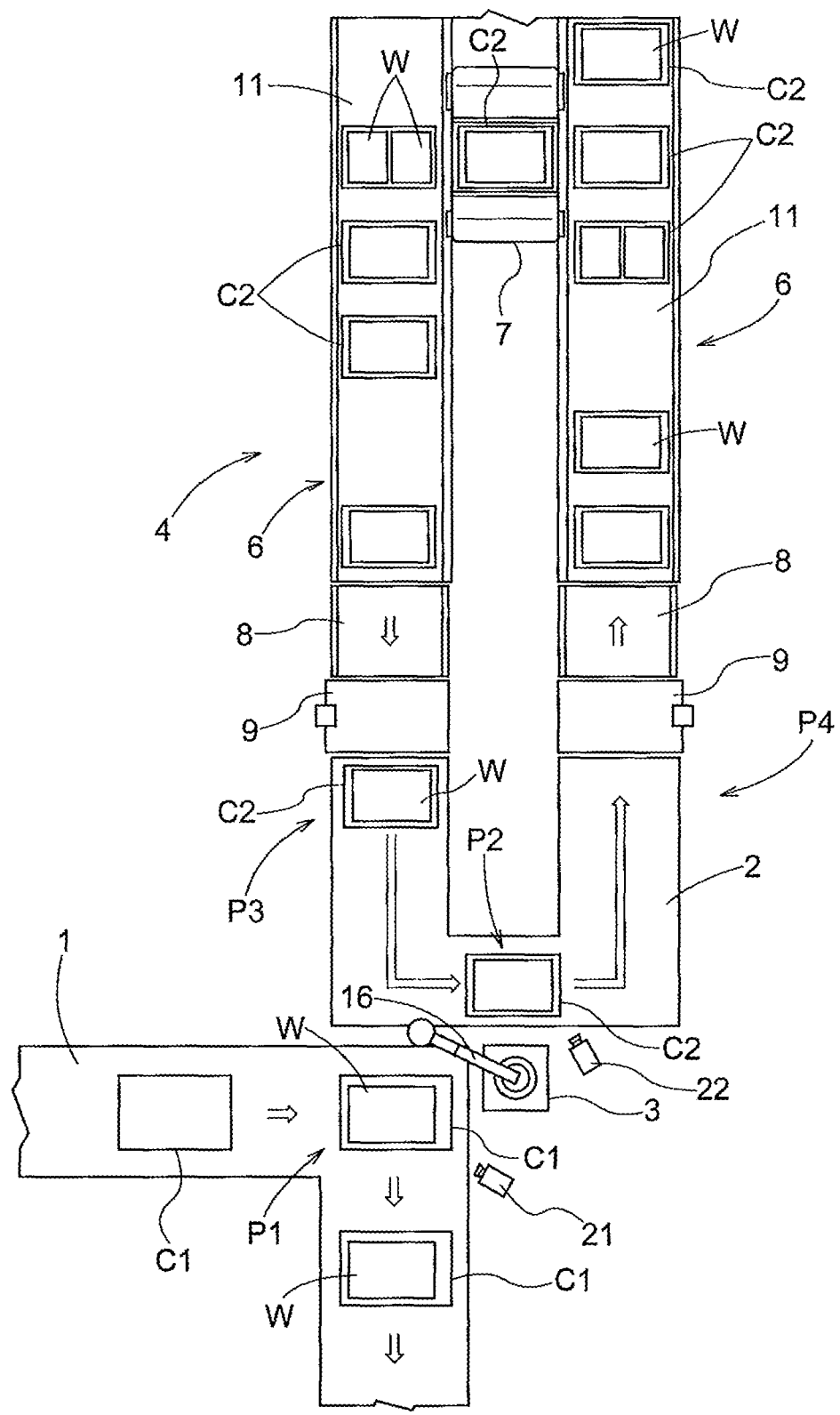
FIG. 1 is a plan view of an article transport facility.

As shown in FIG. 1, an article transport facility includes a first transport apparatus 1 for transferring first containers C1, a second transport apparatus 2 for transferring second containers C2, a transfer apparatus 3 for transferring articles W contained in the second containers C2 to the first containers C1 and putting the articles W into the first container C1, and an automated storage 4 for keeping the second container C2.

Automated Storage

As shown in FIG. 1, the automated storage 4 includes storage shelves 6, a transport carriage 7, relay conveyers 8, and lift apparatuses 9.

A pair of storage shelves 6 is installed while being spaced apart. A plurality of shelf plates 11 are arranged in the up-down direction in each storage shelf 6. The storage shelves 6 store the second containers C2 in a state of supporting the second containers C2 on the shelf plates 11. The transport carriage 7 travels between the two storage shelves 6 along these storage shelves 6 to transport the second containers C2.

The relay conveyers 8 include loading relay conveyers 8, which are used to put the second containers C2 onto the storage shelves 6, and unloading relay conveyers 8, which are used to take the second containers C2 out of the storage shelves 6. A plurality of pairs of these relay conveyers 8 are arranged in the up-down direction in correspondence with the number of shelf plates 11 in the storage shelves 6. The lift apparatuses 9 include a loading lift apparatus 9 and an unloading lift apparatus 9. These lift apparatuses 9 each have a conveyer. The loading lift apparatus 9 can receive the second containers C2 from the second transport apparatus 2, and deliver the second containers C2 to the second transport apparatus 2. The unloading lift apparatus 9 can receive the second containers C2 from the unloading relay conveyer 8, and deliver the second containers C2 to the second conveying apparatus 2.

The automated storage 4 transports each second container C2 stored in the storage shelves 6 to a unloading position P3 using the transport carriage 7, the relay conveyer 8, and the lift apparatus 9, and this second container C2 is taken out of the automated storage 4. Also, the automated storage 4 transports each second container C2 located at a loading position P4 to the storage shelf 6 using the lift apparatus 9, the relay conveyer 8, and the transport carriage 7, and this second container C2 is thus put into the automated storage 4.

First Transport Apparatus and Second Transport Apparatus

The first transport apparatus 1 is constituted by a conveyer, such as a roller conveyer, and transports the first containers C1 in one direction. A first position P1 is set at an intermediate position on a transport path of the first transport apparatus 1. The first transport apparatus 1 transports each first container C1 from a transport origin, which is outside the drawing, to the first position P1, and transports this first container C1 from the first position P1 to a transport destination, which is outside the drawing. No article W is contained in the first container C1 that is transported to the first position P1 by the first transport apparatus 1, but an article W, which has been transferred by the transfer apparatus 3, is contained in a first container C1 that is transported from the first position P1 by the first transport apparatus 1.

The second transport apparatus 2 is constituted by a conveyer, such as a roller conveyer, and transports second containers C2 in one direction. The unloading position P3 is set at an upstream end portion of the transport path of the second transport apparatus 2, and the loading position P4 is set at a downstream end of the transport path of the second transport apparatus 2. Also, a second position P2 is set at an intermediate position on the transport path of the second transport apparatus 2. The second transport apparatus 2 transports each second container C2 from the unloading position P3 to the second position P2, and transports the second container C2 from the second position P2 to the loading position P4. One or more articles W are contained in each second container C2 that is transported to the second position P2 by the second transport apparatus 2. The articles W contained in one second container C2 are of the same type.

That is to say, in the transport facility, an empty first container C1 is transported to the first position P1 by the first transport apparatus 1, and meanwhile, a second container C2 containing articles W is taken out of the automated storage 4, and the second container C2 taken out of the automated storage 4 is transported to the second position P2 by the second transport apparatus 2.

Then, the transfer apparatus 3 takes the articles W out of the second container C2 located at the second position P2, and transfers the articles W from the second container C2 to the first container C1 so that the articles W taken out of the second container C2 are contained in the first container C1 located at the first position P1. The second container C2 of which all of the articles W to be taken out have been taken out is transported from the second position P2 and is put into the automated storage 4 by the second transport apparatus 2. The first container C1 in which all of the articles W to be contained are contained is transported from the first position P1 by the first transport apparatus 1. In the following description, of the articles W contained in a second container C2 that has been transported to the second position P2, each of the articles W to be transferred to a first container C1 will be referred to as an article W to be transferred.

Container

Figure 4:
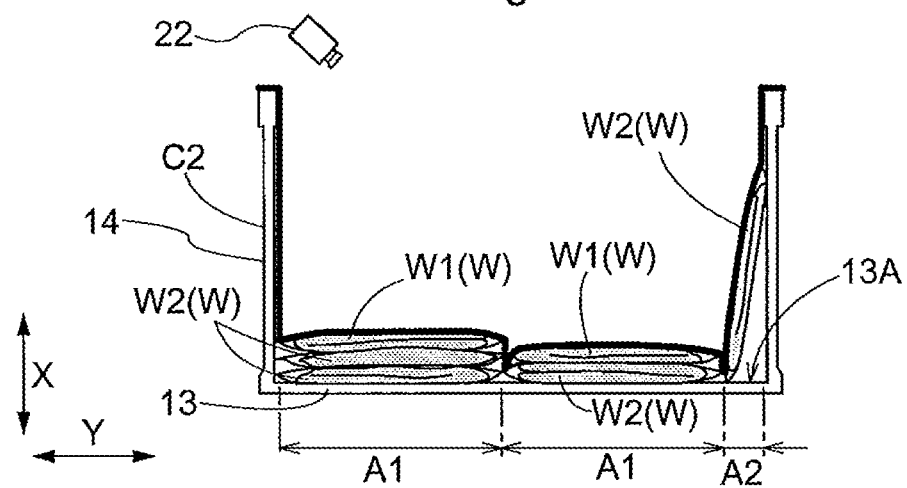
FIG. 4 illustrates a state where determinable articles and an undeterminable article are present in a second container.

As shown in FIG. 4, each second container C2 includes a rectangular supporting portion 13 for supporting articles W from below, and side wall portions 14, which are raised from four sides that form an outer periphery of the supporting portion 13. The first container C1 is formed into a box shape that is open in its upper face. Also, the second container C2 includes a supporting face 13A for supporting articles W. The supporting face 13A is formed by an upper face of the supporting portion 13. Assuming that a direction parallel to the supporting face 13A of the second container C2 is an alignment direction Y, and a direction perpendicular to the alignment direction Y is a stacking direction X, the second container C2 is formed to have a size that allows articles W to be contained in a state of being arranged in the alignment direction Y and the stacking direction X, on the supporting face 13A. Although not shown in the diagrams, the direction perpendicular to the sheets of FIGS. 4 to 13 is also the alignment direction Y parallel to the supporting face 13A. The first container C1 is formed into a box shape that is open in its upper face, similarly to the second container C2, and a description thereof is omitted accordingly.

In this embodiment, corrugated fiberboard boxes are used as the first containers C1, and foldable containers are used as the second containers C2.

Article

Figure 2:
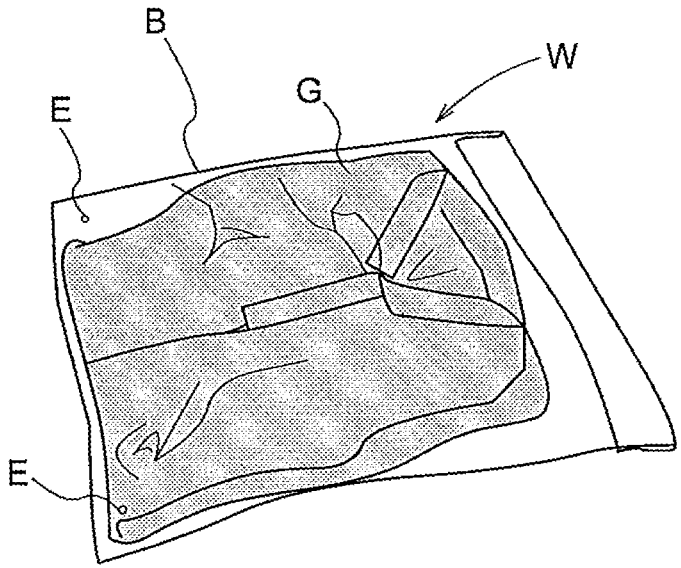
FIG. 2 is a perspective view of an article.

As shown in FIG. 2, an article W has a package B containing a contained item G. There are a plurality of types of articles W, and at least one of the package B and the contained item G differs between different types of articles W. In the this embodiment, each package B is, for example, a soft bag that is made of synthetic resin, or a paper box that is not very soft, and each contained item G is clothing or an accessory, such as a garment, socks, slippers, or sunglasses. That is to say, the articles W include an article W that has a bag-shaped package B containing a garment G serving as a contained item G, such as one shown in FIG. 2, an article that has a cardboard package B containing slippers serving as a contained item G, and the like.

Also, there are articles W in which contained items G contained in packages B are not relatively easily broken (e.g. an article W that contains a garment as a contained item G), and articles W in which contained items G contained in packages B are relatively easily broken (e.g. an article W that contains sunglasses as a contained item G).

An article W using a soft bag as the package B and also using a soft garment as the contained item G is relatively likely to lose its shape, and is soft. In contrast, an article W using a cardboard box that is not very soft as a package B, and an article W in which a paperboard that is not very soft is contained together with the contained item G in the package B are relatively unlikely to lose their shape, and are not very soft. Thus, the article transport facility may deal with soft articles W, and the transfer apparatus 3 transfers soft articles W and articles W that are not soft, from the second containers C2 to the first containers C1.

The articles W may include articles W that have packages B with ventilation holes E, such as one shown in FIG. 2, and articles W with packages B with no ventilation hole E. Even the articles W that have packages B with ventilation holes E may have different sizes or numbers of ventilation holes E. Furthermore, the articles W may have different softnesses depending on the type, as mentioned above. For this reason, when being held and lifted up by the transfer apparatus 3, some articles W are likely to lose their shape and air is likely to enter the packages B thereof from the ventilation holes E, whereas air is not likely to enter the packages B of other articles W because these articles W do not lose their shape, or the articles W lose their shape but have no ventilation hole E or small ventilation holes E.

Transfer Apparatus

Figure 5:
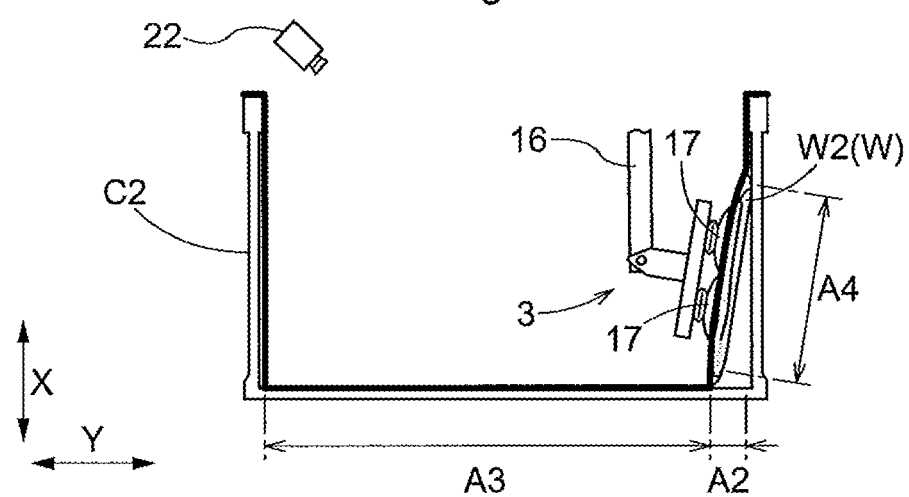
FIG. 5 illustrates a state where the undeterminable article is held by a transfer apparatus.
Figure 6:
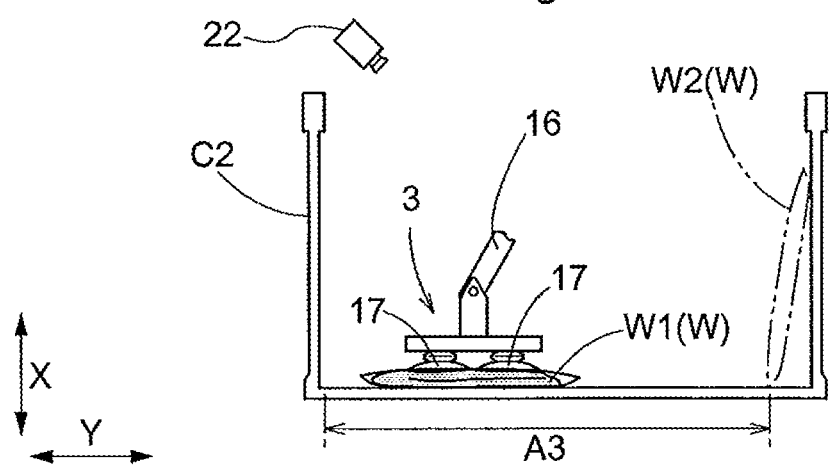
FIG. 6 illustrates a state where the undeterminable article has been transferred to a parallel area.

As shown in FIGS. 5 to 6, the transfer apparatus 3 includes an articulated arm 16 and a suction pad 17 supported at a leading end of the arm 16, and can support an article W while being attached via suction to the upper face thereof using the suction pad 17. The transfer apparatus 3 uses suction to attach and hold, using the suction pad 17, the upper face of an article W contained in a second container C2 located at the second position P2. Then, the transfer apparatus 3 takes the article W out of the second container C2 and puts this article W into a first container C1 located at the first position P1, and thereafter release the suction of the suction pad 17 being attached to the article W to transfer the article W from the second container C2 to the first container C1. Thus, the transfer apparatus 3 transfers an article W to a first container C1 while holding the upper face of a package B, which serves as the upper face of the article W. Note that the "upper face" of an article W refers to an upward direction of an article W in a state of being contained in a first container C1 or a second container C2, and the "upward direction" refers to one direction of the stacking direction X.

Figure 9:
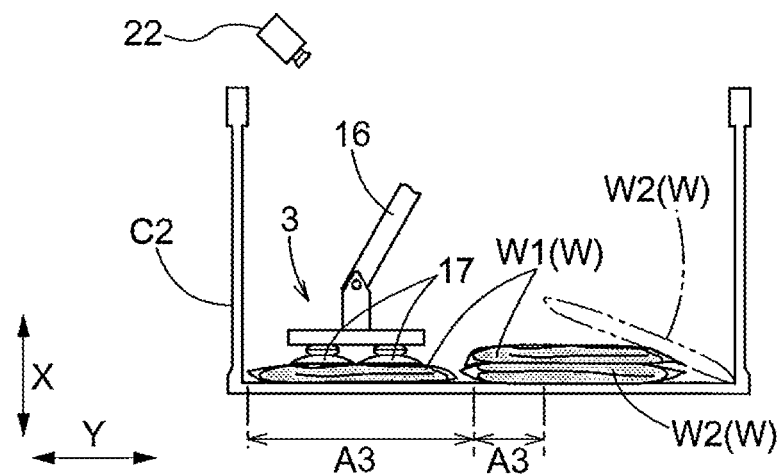
FIG. 9 illustrates a state where the undeterminable article has been transferred to a parallel area.

In this embodiment, the transfer apparatus 3 is provided with the suction pad 17 shown in FIGS. 6, 9, and other diagrams, opposing the supporting face 13A. A plurality of suction pads 17 are aligned in the alignment direction Y. The transfer apparatus 3 selects some or all of the plurality of suction pads 17 in accordance with the type of the article W, particularly the upper face of the article W, and uses suction to attach and support the article W using the selected suction pads 17.

Control Apparatus

Figure 3:
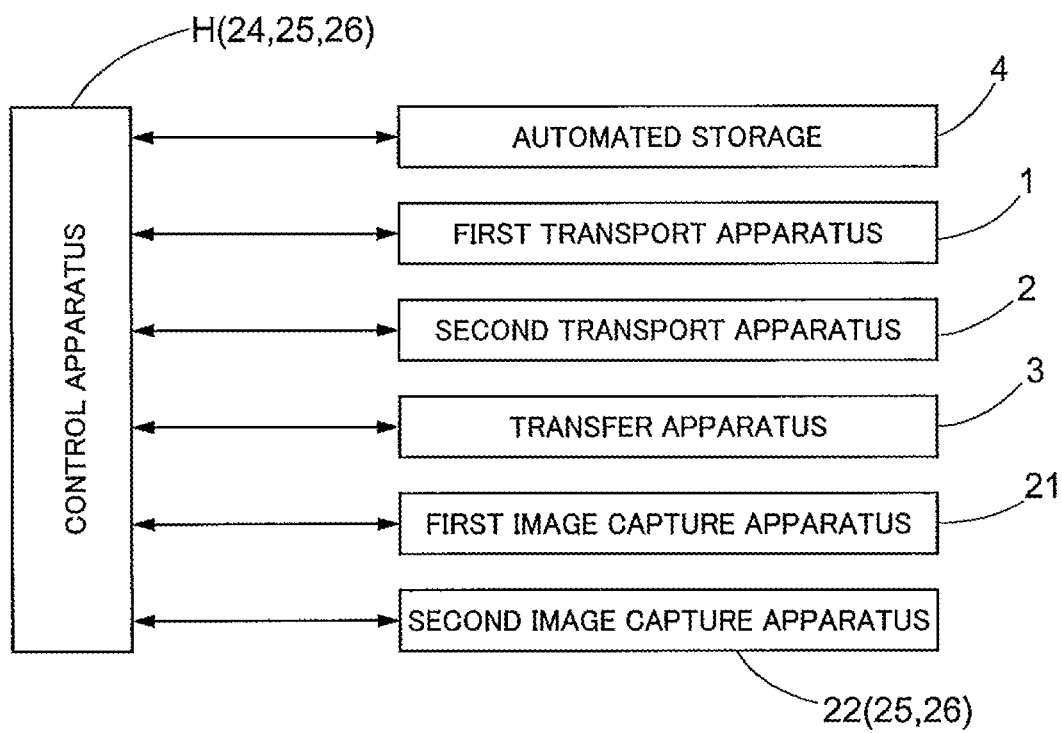
FIG. 3 is a control block diagram.

As shown in FIG. 3, the transport facility includes the first transport apparatus 1, the second transport apparatus 2, the transfer apparatus 3, and a control apparatus H for controlling the automated storage 4.

Each article W is assigned an article code, which differs depending on the type. The article code and article information are stored in association with each other in the control apparatus H. The article information is information indicating the length, width, height, and weight of each article W, as well as pattern information, the centroid position, and so on.

Information indicating the centroid position of each article W when viewed in the up-down direction serves as the information indicating the centroid position, of the article information stored in the control apparatus H. Here, "when viewed in the up-down direction" has the same meaning as "when viewed in the stacking direction X" in a state where the article W is contained in a first container C1 or a second container C2, and the up-down direction refers to a direction perpendicular to the supporting face 13A of the first container C1 or the second container C2.

When causing the transfer apparatus 3 to hold an article W, the control apparatus H causes a suction pad 17 to hold a position (first holding position) that corresponds to the centroid in the upper face of the article W, by means of suction from above. Specifically, in a state where an article W contained in a first container C1 or a second container C2 is held by a suction pad 17, the article W is held so that the centroid position of the article W is located between an end portion of a suction pad 17 located on one side in the alignment direction Y, of the plurality of suction pads 17 aligned in the alignment direction Y, the end portion also being on the one side, and an end portion of a suction pad 17 located on the other side in the alignment direction Y, the end portion being also on the other side.

Thus, information indicating the centroid position of each article W is stored in accordance with an article code, which differs between types, in the control apparatus H, and the first holding position that corresponds to the centroid position of an article W is set for each type of article W. Note that the first holding position is a position on the article W to be held by the transfer apparatus 3.

Also, storage position information regarding each second container C2 kept in the automated storage 4 and a product code of the article W contained in this second container C2 are stored in association with each other in the control apparatus H.

Furthermore, the control apparatus H receives order information from a plurality of shipping destinations. The order information includes code information indicating a product code that is set for each type of article W, and quantity information indicating the quantity of the articles W of the type that corresponds to the product code indicated by the code information.

Also, the control apparatus H receives image capture information from the first image capture apparatus 21 and image capture information from the second image capture apparatus 22. The first image capture apparatus 21 is installed so as to be able to capture images of a first container C1 located at the first position P1 and an article W contained in the first container C1. The first image capture apparatus 21 is installed so as to be able to capture an image of a first container C1 located at the first position P1, and articles W contained in the first container C1 from an opening formed in the upper face thereof. The second image capture apparatus 22 is installed so as to be able to capture an image of a second container C2 located at the second position P2, and articles W contained in this second container C2 from the opening formed in the upper face thereof. Note that the second image capture apparatus 22 corresponds to an image capture apparatus for capturing an image of an article W in a second container C2.

Based on the image capture information from the second image capture apparatus 22, the control apparatus H recognizes the presence of the articles W in the second container C2 located at the second position P2, and determines the type of the articles W whose presence has thus been recognized. More specifically, based on the image capture information from the second image capture apparatus 22, the control apparatus H detects a region higher than the supporting face 13A of the second container C2, and determines that articles W are present in the region higher than the supporting face 13A. The control apparatus H also performs image processing, such as pattern matching, on the region higher than the supporting face 13A based on the pattern information, and determines the type of the present article W. Thus, the control apparatus H has a function of a determining portion 24 for recognizing the presence of an article W in each second container C2 and determining the type of the article W whose presence has been recognized.

Based on the image capture information from the first image capture apparatus 21, the control apparatus H determines the orientation and position of the articles W contained in the first container C1 located at the first position P1, and determines whether or not the articles W are contained in the first container C1 in accordance with the arrangement indicated by arrangement information.

The second image capture apparatus 22 is constituted by a stereo camera. Based on the image capture information from the second image capture apparatus 22, the control apparatus H can determine the height of the supporting portion 13 and the side wall portions 14 of each second container C2, and can also determine the height of articles W in each second container C2. Also, based on the image capture information from the second image capture apparatus 22, the control apparatus H can determine a parallel area A3, which is an area in a state parallel to the supporting face 13A of the second container C2.

Note that an area detecting portion 25 for detecting the parallel area A3 and a height detecting portion 26 for detecting the height of each portion of the inside of each second container C2 are constituted by the control apparatus H and the second image capture apparatus 22. Also, the "parallel state" includes not only a state of being parallel to the supporting face 13A, but also a state of being slightly inclined relative to the supporting face 13A (by several degrees).

Figure 14:
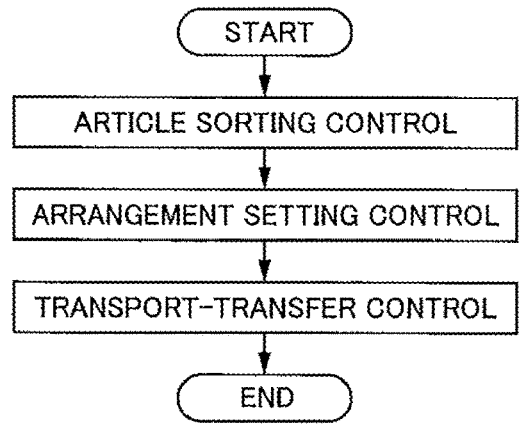
FIG. 14 is a flowchart of transfer control.

As shown in FIG. 14, the control apparatus H performs an article sorting control, an arrangement setting control, and a transport-transfer control, in this order. The article sorting control is a control to set the quantity of the first containers C1 for stacking articles W to be transferred, indicated by the order information. The arrangement setting control is a control to set the arrangement, in a first container C1, of one or more articles W to be transferred and contained in one first container C1, and to set article order, namely the order in which the articles W are stacked in the first container C1 in accordance with the arrangement. The transport-transfer control is a control that is performed based on the set arrangement and article order, to control the first transport apparatus 1, the second transport apparatus 2, and the transfer apparatus 3 so as to transfer articles W to be transferred to a first container C1 in the orientation and position indicated by the arrangement, in the order indicated by the article order.

Article Sorting Control

The article sorting control sets the quantity of the first containers C1 to contain articles W to be transferred indicated by the order information.

Specifically, articles W are contained so that the total volume of the articles W contained in one first container C1 is less than or equal to a set volume, i.e. a volume set for the first container C1 for containing these articles W, in accordance with the volume and quantity of the articles W to be transferred indicated by the order information. In this embodiment, the set volume is 60% of the accommodatable volume of the first container C1. If the total volume of the articles W to be transferred indicated by the order information is 60% or less of the accommodatable volume of the first container C1, the articles W to be transferred are regarded as being able to be contained in one first container C1, and the quantity of the first containers C1 is set to 1. If the total volume of the articles W to be transferred indicated by the order information exceeds 60% of the accommodatable volume of the first container C1, the quantity of the first containers C1 is set to 2 or more so that the total volume of the articles W to be contained in each first container C1 is 60% or less of the accommodatable volume thereof.

Arrangement Setting Control

The arrangement setting control sets the arrangement that indicates the orientation and position, in a first container C1, of one or more articles W to be contained in one first container C1 so that the height of the articles W does not exceed a set height. Also, the arrangement setting control sets article order, which is the order in which the articles W are stacked in the first container C1 so as to be able to stack the articles W in accordance with the set arrangement.

Transport-Transfer Control

The transport-transfer control causes one or more articles W from one or more second containers C2 to be contained in one first container C1 by performing a first transport control, a second transport control, and a transfer-containing control. At this time, all of the articles W to be transferred indicated by the order information are transferred to the one first container C1, and are contained in the arrangement indicated by the arrangement information.

The second transport control controls the second transport apparatus 2 and the automated storage 4 to transport a second container C2 from the storage shelf 6 to the second position P2 and, after all of the articles W to be transferred contained in the second container C2 have been taken out at the second position P2 by the transfer apparatus 3, transport this second container C2 from the second position P2 to the storage shelf 6.

The first transport control controls the first transport apparatus 1 to transport an empty first container C1 from the outside to the first position P1 and, after all of the articles W to be transferred that are to be contained in the first container C1 at the first position P1 have been put therein by the transfer apparatus 3, transports this first container C1 from the first position P1 to the outside.

The transfer-containing control controls the transfer apparatus 3 to unload the articles W to be transferred that are contained in the second container C2 at the second position P2, and put the articles W into the first container C1 at the first position P1 in the arrangement indicated by the arrangement information.

Transfer-Containing Control

Next, the transfer-containing control will be described.

The transfer-containing control includes an article determination control, a parallel area detection control, a transfer control, and a position correction control.

During the article determination control, the presence of the articles W in the second container C2 located at the second position P2 is recognized, and the type of the articles W whose presence has thus been recognized is determined, based on the image capture information from the second image capture apparatus 22. More specifically, during the article determination control, an area in which it is detected that the height thereof is higher than the supporting face 13A of the second container C2 is recognized as a presence area A1 or A2 in which articles W are present. An area in which the type of the articles W can be determined is a first area A1. If there is a second area A2, which is an area other than the first area A1, it is determined that an article W whose type cannot be determined is present in the second area A2. Note that the case where "the type cannot be determined" includes not only the case where, as a result of image processing such as pattern matching, the outer shape of an article W can be recognized but the type thereof cannot be determined, as well as the case where the type of an article W cannot be determined because the outer shape thereof cannot be recognized.

Figure 7:
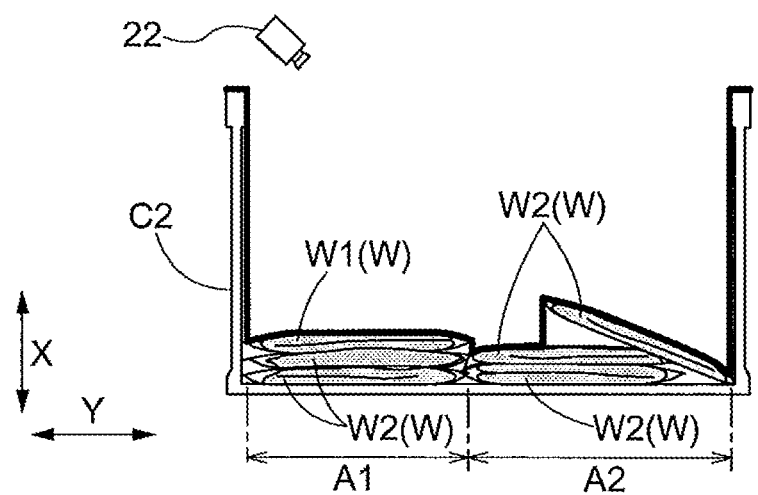
FIG. 7 illustrates a state where determinable articles and an undeterminable article are present in the second container.
Figure 8:
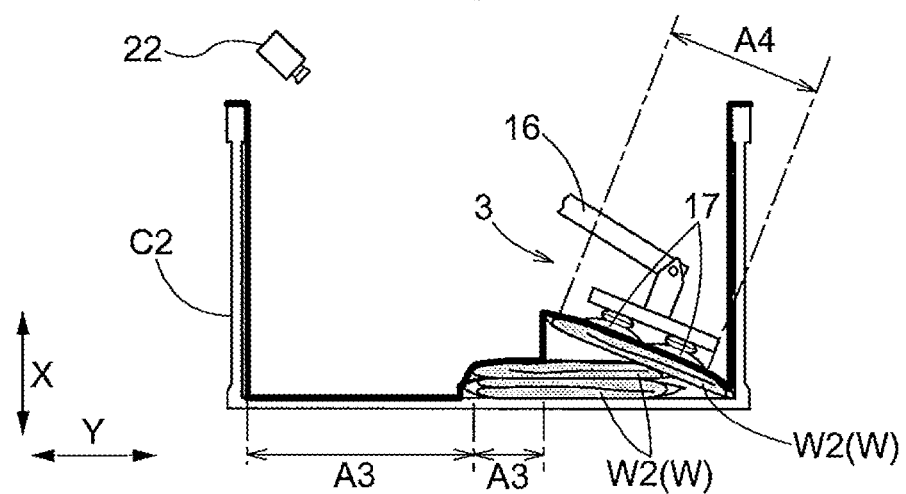
FIG. 8 illustrates a state where the undeterminable article is held by the transfer apparatus.
Figure 10:
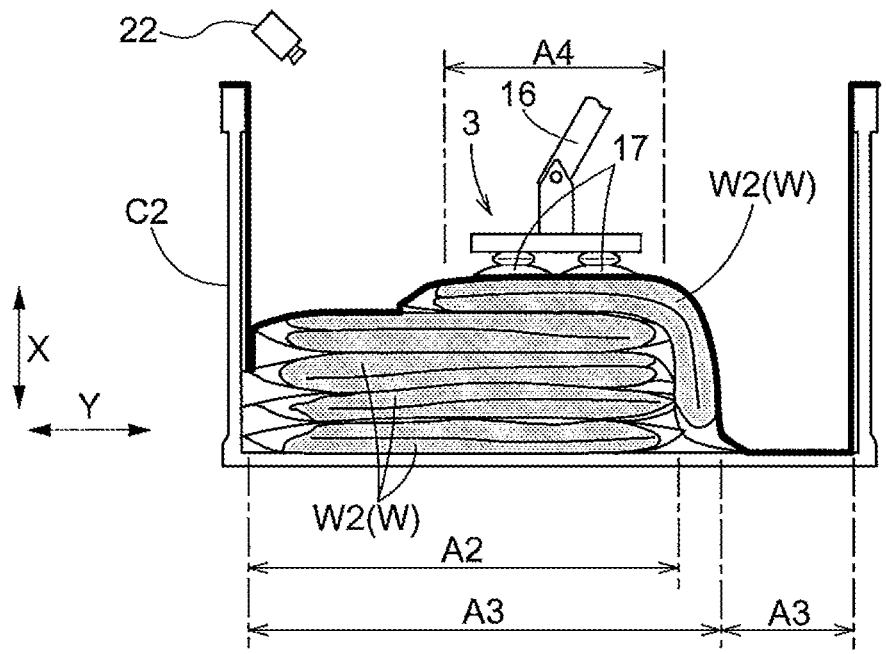
FIG. 10 illustrates a state where an undeterminable article is held by the transfer apparatus.
Figure 11:
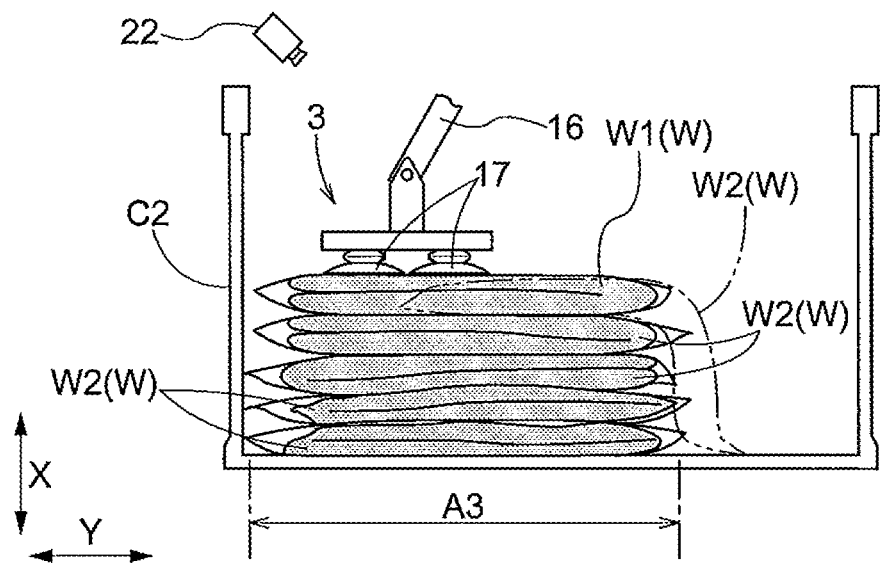
FIG. 11 illustrates a state where the undeterminable article has been transferred to a parallel area.
Figure 12:
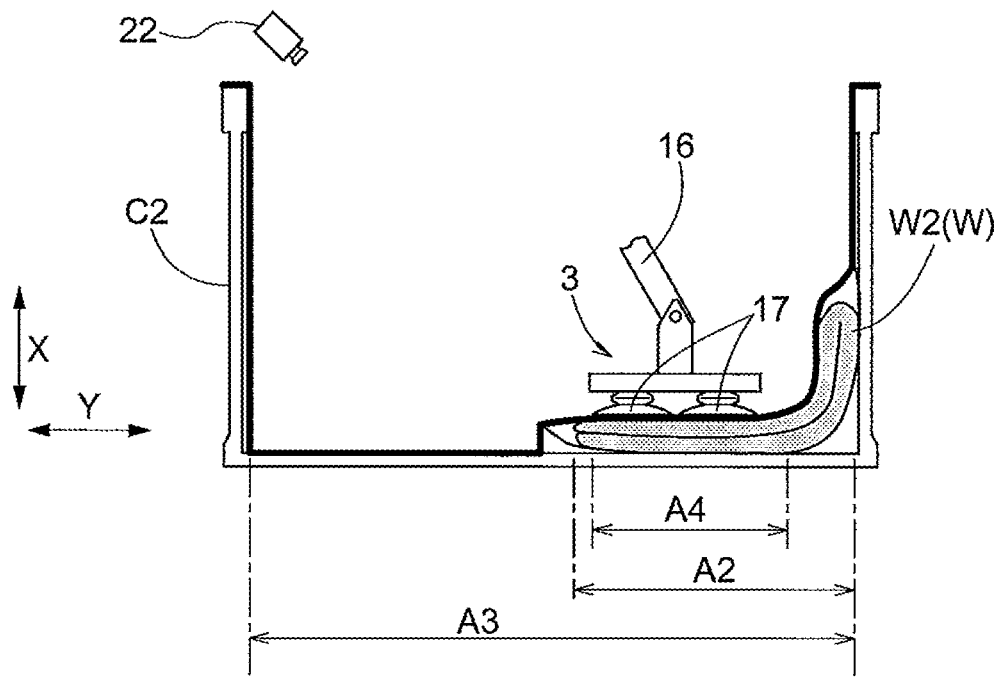
FIG. 12 illustrates a state where an undeterminable article is held by the transfer apparatus.
Figure 13:
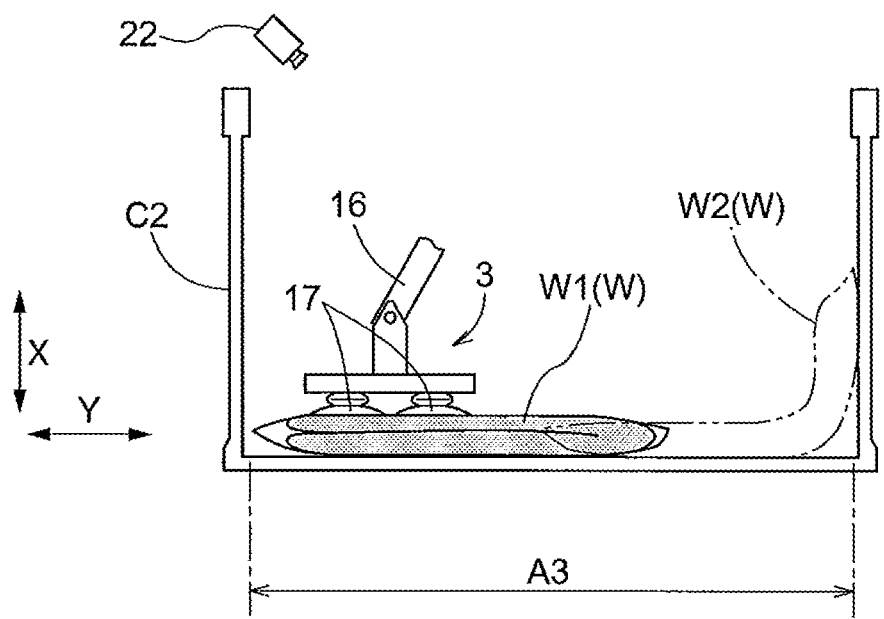
FIG. 13 illustrates a state where the undeterminable article has been transferred to a parallel area.

During the article determination control, initially, images of a second container C2 and the inside thereof are captured, and the height (which is indicated by thick lines in FIGS. 4, 7, and 10) within the second container C2 is detected. At this time, the area inward of an area in which a height corresponding to the height of the side wall portions 14 of the second container C2 has been detected is regarded as the area within the second container C2, and the height in the area within the second container C2 is detected. An area in the second container C2 that is higher than the supporting face 13A is regarded as the area A1 or A2 in which articles W are present, and determination of the type of the articles W is attempted through image processing. The uppermost articles W, of the stacked articles W, that are not covered by other articles W, such as those shown in FIGS. 4 and 7, are determinable articles W1, which are articles W whose type can be determined. On the other hand, articles W in an orientation that significantly differs from an appropriate orientation relative to the second container C2, and articles W that are partially covered by other articles W, such as those shown in FIGS. 4, 7, and 10, are undeterminable articles W2, which are articles W whose type cannot be determined.

An area in which the determinable articles W1 are present is determined as the first area A1, and an area other than the first area A1 are determined as the second area A2 in which the undeterminable articles A2 are present.

During the parallel area detection control, a parallel area A3 is detected that is parallel to the supporting face 13A of each second container C2. That is to say, during the parallel area detection control, an area in which an image of the supporting face 13 has been captured and an area in which the upper faces of articles W that are parallel to the supporting face 13A are present, are determined as parallel areas A3. At this time, in the case where there are a plurality of parallel areas A3 with different heights that are formed by the upper faces of articles W, if the height of a step between one of these parallel areas A3 and a parallel area A3 in which an article W that is to be held by the transfer apparatus 3 is smaller than or equal to the thickness of an article W of the type contained in the second container C2 containing the article W to be held, these parallel areas A3 are determined as one continuous parallel area A3.

The transfer control is a control performed on articles W that have been recognized and whose type has been determined by the determining portion 24. The position correction control is a control performed on articles W that have been recognized but whose type has not been determined by the determining portion 24.

During the transfer control, the transfer apparatus 3 is controlled to hold the first holding position on each article W contained in the second container C2 and transfer this article W to the first container C1.

During the position correction control, the transfer apparatus 3 is controlled so that a second holding position on each article W contained in the second container C2, the second holding portion being able to be held by the transfer apparatus 3, is determined, and the second holding position is held to move each article W within the second container to a parallel area A3. More specifically, when an article W is moved through the position correction control, a suction pad 17 is attached, via suction, to the second holding position on the article W, and this suction pad 17 is lifted up to lift up the article W and is moved in the alignment direction Y to move the article W to a space immediately above a parallel area A3. Thereafter, the suction pad 17 is lowered to the height equal to the thickness of the article W relative to the upper face of the parallel area A3, places the article W in the parallel area A3, and the suction of the suction pad 17 attached to the article W is released.

The second holding position may be any position within an area of a second container C2 in which the presence of an article W has been recognized based on the image capture information from the second image capture apparatus 22. In this embodiment, any position that a suction pad 17 of the transfer apparatus 3 can be attached via suction may be the second holding position. More preferably, a holding area A4, which is widest among the flat areas, images of which have been captured by the second image capture apparatus 22, of an undeterminable article W2, may be determined, and a position corresponding to the center of the holding area A4 may be set as the second holding position.

The control apparatus H selects one or more suction pads 17 for holding an article W from among a plurality of suction pads 17, based on the breadth of the holding area A4. If the breadth of the holding area A4 is too large to be attached via suction by one suction pad 17, or if the weight of an article W is too large to be attached via suction by the selected number of suction pads 17, it can be determined that this article W is an unholdable article W. If an article W that is to be held is not an unholdable article W, it is determined that this article W is a holdable article W. Here, if it is determined that an article W is an unholdable article W, the control apparatus H determines that the position correction control cannot be performed.

If articles W contained in a second container C2 includes an article W whose type has been determined by the determining portion 24 and an article W whose type has not been determined by the determining portion 24, the control apparatus H controls the transfer apparatus 3 to preferentially transfer the article W whose type has been determined by the determining portion 24 to a first container C1.

That is to say, if articles W are contained in a second container C2 as shown in FIG. 7, the type of the uppermost article W in the articles stacked on the left side of the second container C2 has been determined, and accordingly is transferred first. After this uppermost article W has been transferred, the type of the second article W from the top (i.e. the new uppermost article W) can then be determined, and this article W accordingly is transferred next. After all of the articles stacked on the left side have been transferred, no article W whose type has been determined is left in the second container C2, and only the articles W whose type cannot be determined are left. In this situation, the position correction control is performed to hold the holding area A4 of the article W located at the highest position, of the articles W whose type cannot be determined, the holding area A4 facing upward, to move the article W.

Figure 15:
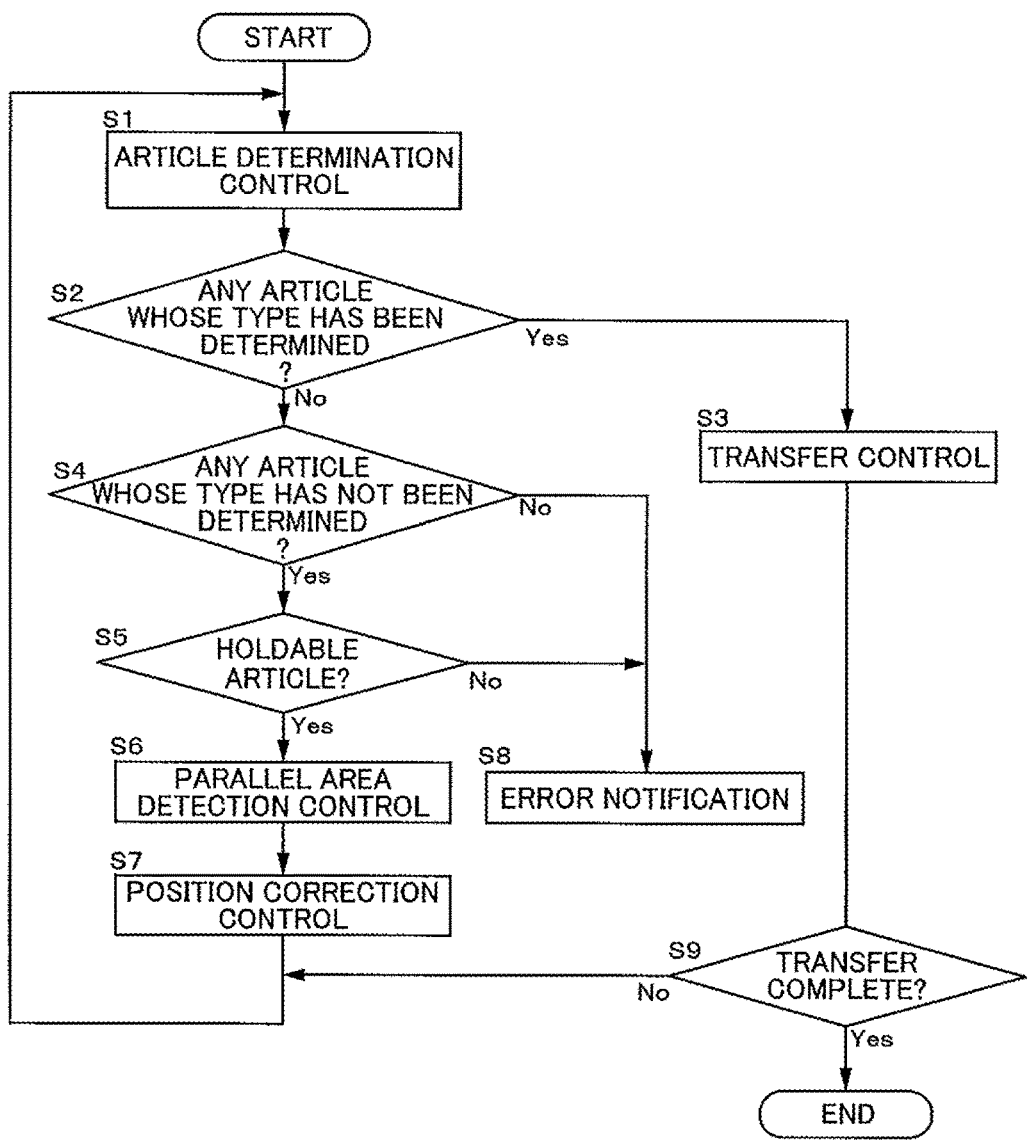
FIG. 15 is a flowchart of a transfer-containing control.

A further description will be given of the transfer-containing control, based on the flowchart shown in FIG. 15.

If the articles W contained in the second container C2 include an article W whose type has been determined, this article W is selected as the article W to be transferred, and the transfer control is performed to transfer this article W to a first container C1 (S1 to S3).

If the articles W contained in the second container C2 include no article W whose type has been determined, but include an article W whose type cannot be determined, the parallel area detection control is performed to determine a parallel area A3, and then the position correction control is performed to move the undeterminable article W2 to the parallel area A3 (S1, S2, S4 to 7).

If transfer of all of the articles W that are to be transferred from the second container C2 is complete (S9), the transfer-containing control ends.

In the case where transfer of all of the articles W that are to be transferred from the second container C2 is not complete, if an article W that should be present in the second container C2 is not present (none of the determinable article W1 and the undeterminable article W2 are present in the second container C2), or if an article W is present in the second container C2 but this article W is an unholdable article W and the position correction control cannot be performed, an alarm is operated to issue an error notification (S4, S5, S8).

2. Other Embodiments

Next, other embodiments of the article transport facility will be described.

(1) In the above embodiment, during the position correction control, an article W is moved to a parallel area A3 based on detection information from the area detecting portion 25. However, during the position correction control, an article W may alternatively be moved a correction position that is set in advance in the up-down direction in the second container C2.

(2) In the above embodiment, in the case where articles W contained in a second container C2 include a determinable article W1 and an undeterminable article W2, the determinable article W1 is preferentially transferred to a first container C1, rather than correcting the position of the undeterminable article W2 first. However, this may not necessarily be the case. In the case where articles W contained in a second container C2 include a determinable article W1 and an undeterminable article W2, if there is an undeterminable article W2 whose position can be corrected without transferring the determinable article W1 to the first container C1, the position of the undeterminable article W2 may be preferentially corrected, rather than transferring the determinable article W1 to the first container C1 first.

(3) In the above embodiment, the first holding position is a position that corresponds to the centroid of each article W. However, the first holding position may be changed as appropriate, and the first holding position may be a position that corresponds to the center of each article W when viewed in the up-down direction, for example.

(4) In the above embodiment, during the position correction control, an article W is moved to a parallel area A3 by lowering a suction pad 17 to the height equal to the thickness of the article W relative to the upper face of the parallel area A3, and thus, the article W is moved to and put into the parallel area A3. However, a configuration may alternatively be employed in which, during the position correction control, an article W is moved to a space immediately above the parallel area A3, then the suction of the suction pad 17 being attached to the article W, thereby dropping the article into the parallel area A3.

(5) In this embodiment, a corrugated fiberboard box is used as each first container C1, but a foldable container may alternatively be used as each first container C1. In the case of using a corrugated fiberboard box as each first container C1, a corrugated fiberboard box may be used whose side faces can be internally folded so that the height of the side faces is variable (i.e. the capacity is variable).

(6) In the above embodiment, articles W of one type are contained in one second container C2, but articles W of two or more types may alternatively be contained in one second container C2. Also, each second container C2 may also be provided with a partition for separating the space in the second container C2 into a plurality of areas, and articles W of different types may be contained in different areas in the case where articles W of two or more types are contained in one second container C2 as mentioned above.

(7) In the above embodiment, each contained item G is clothing or an accessory, but each contained item G may alternatively be an item other than clothing or an accessory, e.g. may be food, an everyday item, or the like.

(8) Note that the configurations disclosed in the above embodiment may be combined with the configurations disclosed in the other embodiments for application, provided there is no inconsistency. Regarding other configurations as well, the embodiments disclosed in this specification are merely examples in all aspects. Accordingly, various modifications may be made as appropriate without departing from the gist of the present disclosure.

3. Summary of the Above Embodiment

A summary of the above-described article transport facility will be described below.

An article transport facility includes a transfer apparatus for transferring a soft article from a second container to a first container, and a control apparatus for controlling the transfer apparatus, and the article transport facility includes:

an image capture apparatus configured to capture an image of the article in the second container; and a determining portion configured to recognize the presence of the article in the second container, and determine the type of the article whose presence has been recognized, based on image capture information from the image capture apparatus, wherein a first holding position at which the article is held by the transfer apparatus is set for each type of article, the control apparatus performs transfer control that is performed on the article that has been recognized and whose type has been determined by the determining portion, and position correction control that is performed on the article that has been recognized but whose type has not been determined by the determining portion, during the transfer control, the transfer apparatus is controlled to hold the first holding position on the article contained in the second container and move the article to the first container, and during the position correction control, the transfer apparatus is controlled to determine a second holding position at which the article contained in the second container can be held by the transfer apparatus, and hold the second holding position to move the article within the second container.

With this configuration, as for an article whose type has been determined by the determining portion, the article can be transferred from the second container to the first container by the transfer apparatus by performing the transfer control. In the case of thus transferring the article, the article is transferred with the first holding position, which is preset on the article, being held by the transfer apparatus, and accordingly, the article can be readily transferred appropriately from the second container to the first container.

Also, as for an article whose type has not been determined by the determining portion, the article is moved within the second container by the transfer apparatus by performing the position correction control. By thus moving the article within the second container, the orientation of a soft article is expected to change. For this reason, there are cases where the type of an article after being moved through the position correction control is determined by the determining portion, and the article whose type has been determined by the determining portion can be appropriately transferred from the second container to the first container by performing the transfer control.

Thus, even if there is an article whose type has not been determined by the determining portion, articles can be continuously transferred by the transfer apparatus without stopping the article transport facility, by performing the position correction control. As a result, the articles can be efficiently transferred by the transfer apparatus.

Here, it is preferable that the articles transport facility further includes an area detecting portion configured to detect a parallel area that is an area parallel to a supporting face of the second container, the supporting face supporting the article, wherein, during the position correction control, the control apparatus moves the article to the parallel area based on information from the area detecting portion.

With this configuration, during the position correction control, an article whose type has not been determined by the determining portion is moved to the parallel area that is parallel to the supporting face and is detected by the area detecting portion. For this reason, the article transferred to the parallel area through the position correction control is likely to assume an orientation that is suitable for the type determination performed by the determining portion, and it is more likely that the type of the article can be determined by the determining portion after performing the position correction control.

Also, it is preferable that, if the second container contains the article whose type has been determined by the determining portion and the article whose type has not been determined by the determining portion, the control apparatus controls the transfer apparatus to preferentially transfer, to the first container, the article whose type has been determined by the determining portion.

With this configuration, by preferentially transferring an article whose type has been determined to the first container, articles whose type has been determined can be removed from the surroundings of an article whose type has not been determined. As a result, the type can be readily determined by the determining portion, and an article can be readily moved through the position correction control so that the article can assume an orientation suitable for the type determination performed by the determining portion.

It is preferable that the article transport facility further includes a height detecting portion configured to detect the height of each portion of an inside of the second container, wherein the second container has a supporting face for supporting the article, and the determining portion recognizes an area in the second container, the area regarding which it is detected that the height thereof is higher than the height of the supporting face, as a presence area in which the article is present, and if the presence area includes a second area, which is an area other than a first area in which the article whose type has been determined is present, the determining portion determines that the article whose type cannot be determined is present in the second area.

With this configuration, since whether or not any article is present in the second container can be determined by the height detecting portion, it is possible to reduce the possibility that the presence of an article itself cannot be recognized, even if the type of an article cannot be determined by the determining portion. Accordingly, the position correction control can be performed appropriately, and as a result, articles can be efficiently transferred by the transfer apparatus.

It is preferable that the first holding position is a position that corresponds to a centroid of the article, and the second holding position is any position in an area in the second container, the area in which it is recognized that the article is present based on the image capture information.

With this configuration, an article whose type has been determined by the determining portion can be readily held stably by the transfer apparatus by holding the first holding position that corresponds to the centroid of the article. As for an article whose type cannot be determined by the determining portion, some position on the article whose type cannot be determined can be held by the transfer apparatus by holding any position in the area in which it is recognized, based on the image capture information, that the article is present in the second container.

The technique according to this disclosure can be used for an article transport facility that includes a transfer apparatus for transferring an article from a first container to a second container.

What is claimed is:

1. An article transport facility that includes a transfer apparatus for transferring a soft article from a second container to a first container, and a control apparatus for controlling the transfer apparatus, the article transport facility comprising:
   an image capture apparatus configured to capture an image of the article in the second container; and
   a determining portion configured to recognize the presence of the article in the second container, and determine the type of the article whose presence has been recognized based on image capture information from the image capture apparatus, wherein:

a first holding position at which the article is held by the transfer apparatus is set for each type of article, the control apparatus performs a transfer control of the transfer apparatus for an article that has been recognized and whose type has been determined by the determining portion, and a position correction control of the transfer apparatus for an article that has been recognized but whose type has not been determined by the determining portion, during the transfer control, the transfer apparatus is controlled to hold the first holding position on the article contained in the second container, and move the article to the first container, and during the position correction control, the transfer apparatus is controlled to determine a second holding position at which the article contained in the second container can be held by the transfer apparatus, and hold the second holding position to move the article within the second container.

2. The article transport facility according to claim 1, further comprising:

an area detecting portion configured to detect a parallel area, the parallel area is an area parallel to a supporting face of the second container, the supporting face supports the article, and wherein, during the position correction control, the control apparatus moves the article to the parallel area based on information from the area detecting portion.

3. The article transport facility according to claim 1, wherein if the second container contains an article whose type has been determined by the determining portion and an article whose type has not been determined by the determining portion, the control apparatus controls the transfer apparatus to preferentially transfer, to the first container, the article whose type has been determined by the determining portion.

4. The article transport facility according to claim 1, further comprising:

a height detecting portion configured to detect a height of different portions inside the second container, the second container includes a supporting face that supports the article, wherein when the determining portion recognizes an area in the second container, if the height of the detected area is higher than the height of the supporting face, it is determined that an article is present, and the area is considered a presence area, and wherein if the presence area includes a second area, which is an area other than a first area in which the article whose type has been determined is present, the determining portion determines that the article whose type cannot be determined is present in the second area.

5. The article transport facility according to claim 1, wherein the first holding position is a position that corresponds to a centroid of the article, and wherein the second holding position is any position in an area in the second container where it is recognized that an article is present based on the image capture information.

* * * * *